United States Patent [19]

Ketterer et al.

[11] Patent Number: 4,732,419
[45] Date of Patent: Mar. 22, 1988

[54] CARRIER FOR CONVEYING HORSES, PARTICULARLY A TRAILER

[75] Inventors: Michael Ketterer, 7500 Karlsruhe 21; Erwin Meroth, Cologne, both of Fed. Rep. of Germany

[73] Assignee: Michael Ketterer, Fed. Rep. of Germany

[21] Appl. No.: 922,854

[22] Filed: Oct. 24, 1986

[30] Foreign Application Priority Data

Oct. 26, 1985 [DE] Fed. Rep. of Germany ....... 3538196

[51] Int. Cl.$^4$ ............................................ B62D 33/08
[52] U.S. Cl. .................................. 296/26; 296/24 C; 119/7
[58] Field of Search .................... 296/26, 24 C, 24 R, 296/100, 216; 119/7, 8

[56] References Cited

U.S. PATENT DOCUMENTS

| | | | |
|---|---|---|---|
| 2,531,140 | 11/1950 | Linde | 296/100 |
| 2,963,313 | 12/1960 | Bennett | 296/26 |
| 3,053,224 | 9/1962 | Pierce | 296/24 C |
| 3,924,889 | 12/1975 | Gogush | 296/26 |
| 4,613,181 | 9/1986 | Rofi-Zadeh | 296/100 |

Primary Examiner—Robert R. Song
Attorney, Agent, or Firm—Steele, Gould & Fried

[57] ABSTRACT

The carrier for conveying horses has a tub-like substructure (22) mounted on a chassis (20), the substructure being provided with a rear door for entry and exit. The substructure (22) is closed at the top by means of a roof (34). In order to provide a certain free field of vision for the horses in an obliquely forward-oriented direction and to prevent the horses from appreciating the limited interior space of the horse transport carrier when they enter, a lift device for elevating the roof (34) from the substructure (22) is provided between the substructure (22) and the roof (34). From the normal, closed position, the roof (34) can be elevated in desired increments to an elevated position providing a free space between the roof (34) and the substructure (22).

15 Claims, 3 Drawing Figures

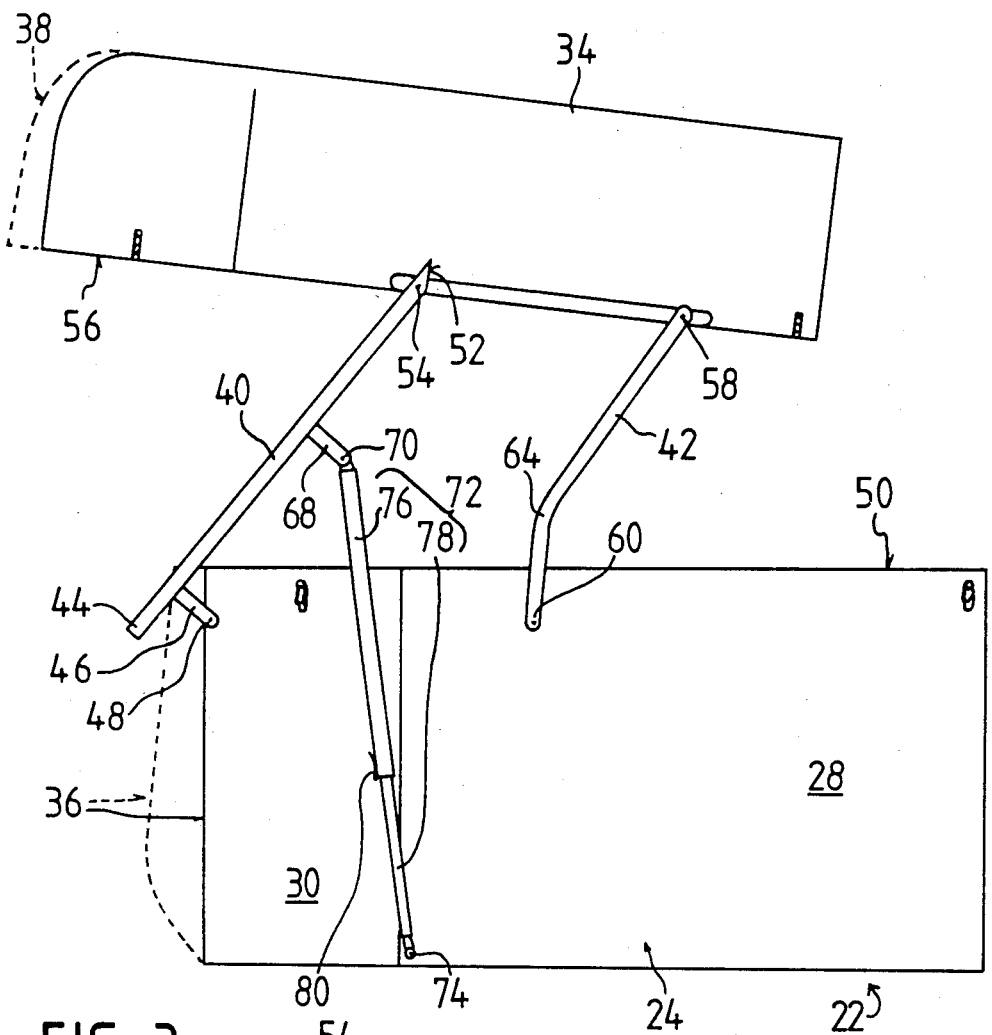
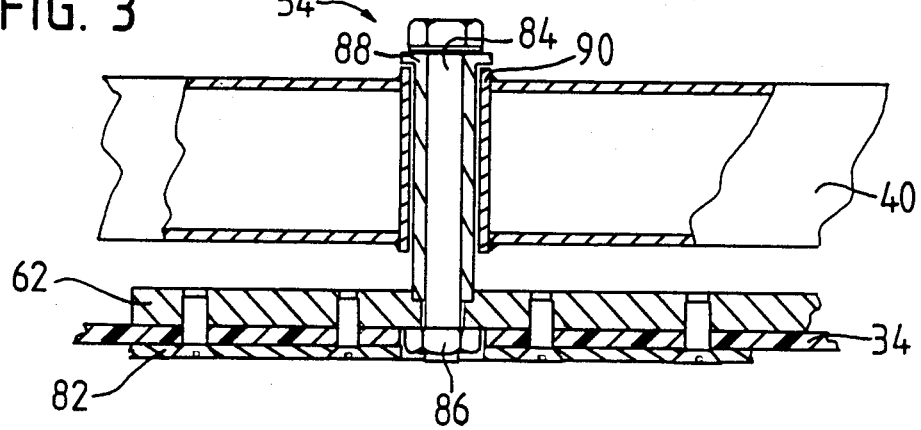

CARRIER FOR CONVEYING HORSES, PARTICULARLY A TRAILER

BACKGROUND OF THE INVENTION

The invention refers to a carrier for conveying horses, particularly a trailer, with a tub-shaped substructure mounted on a chassis, at the rear end of which the entry and exit door is provided, and with a roof supported on the substructure.

On the roads, horses are mostly transported in horse transport trailers which, in the majority of cases, are pulled by a passenger car. In some cases, self-propelled horse transport carriers are also used, but the use of these is basically limited to professionals. The invention primarily refers to but is not limited to road transport carriers of this nature. Thus, the concept of "horse transport carrier" also includes any kind of transport boxes suitable for other means of transportation, particularly for aircraft.

Frequently, horses will let themselves be moved only with greatest difficulty into the interior of a horse transport carrier; many horses will shy before or while entering into the darker interior of the horse transport carrier, which is closed in the direction of their view. Often, they can be convinced to enter the transport carrier only after a long time and with great effort. This is particularly due to the fact that for reasons of traffic technology, the horse transport carrier must not exceed a certain height. A great height also means a large impact surface for wind, particularly side wind. Accordingly, the roof of a horse transport carrier is significantly lower than that of e.g. a stall in the stable.

In order to simplify the entry of the horses into the horse transport carrier, transport carriers are already known which have a door not only in the rear wall—as does the horse transport carrier initially mentioned—but also in the front wall. This front door is opened when the horse is to enter the transport carrier, and closed as soon as the horse is inside it. A chest bar is provided so that the horse will not exit through the front door.

However, such horse transport carriers with two doors have not been successful. On one hand, the chassis must be more solidly designed than for horse transport carriers with only one door, since the stability is decreased by the second door. Secondly, the door provides merely a lower opening which, although it allows light in the interior in the transport carrier, nevertheless blocks the obliquely upward vision of the horse. The horse will mainly get an impression of being sent into a narrow passage of which the upper area cannot be recognized, and the result is a feeling of being closed in.

This is where the invention is advantageous. An object of the invention is to avoid the disadvantages of the known horse transport carriers with two doors and to further develop the horse transport carrier of the nature mentioned initially, so that the spatial limitations of the horse transport carrier cannot be appreciated by the horses at the moment they enter into or leave the horse transport carrier. Thereby, a solution was to be found which also makes it possible to remodel existing horse transport carriers while simultaneously ascertaining that the insulation against draft and wetness (rain) which has been achieved in current horse transport carriers is not lost.

On the basis of the single door horse transport carrier of the nature initially mentioned, this problem is solved by means of a lift device which can elevate the roof above the substrate and which is located between the substructure and the roof. From a normal, closed position, the roof can be elevated into a position in which a free space occurs between the roof and the substructure.

When the roof is lifted off the substructure, the horse has a free field of vision forwards and towards the sides while entering the carrier, so that it initially does not realize the narrowness of the transport carrier. In the elevated position, the roof is at a level which corresponds to the ceiling height e.g. of a stall in the stable. What is generally achieved is that even sensitive horses can be moved to enter the transport carrier with considerably greater ease than was the case with other, particularly smaller transport carriers (e.g. for two horses).

The design of the lift device is subject to variations; pantograph type systems, lift systems with toothed racks or spindles, etc. are all suitable. In a particularly preferred design, the lift device is developed as a parallelogram system. This system has the specific advantages that on one hand, the movements of the lift systems on the left side and on the right side can be synchronized at low cost, e.g. by connecting the front moving arms, whereby the available interior space of the horse transport carrier remains unchanged. On the other hand, the lift device may be developed so that in the front portion, the roof is elevated more than in the rear portion, i.e. that an inclination is achieved in the elevated position. For the horse, the advantage thereof is that the vision field obliquely upwards is freed in an improved manner.

The lift device is particularly suitable for horse transport carriers with single shell synthetic roof, e.g. of polyester. Such roof shells have relatively high dimensional stability and thus need only a few attachment points to the substructure. However, the lift device can also be installed in other horse transport carriers, e.g. with textile roofs stiffened by means of metal or synthetic ribbing. The particular advantage of the lift device can be found in that it can be activated practically in seconds and with little force, and the operation can be carried out from a location which is comfortably reached.

In the preferred execution already discussed, the legs of a largely rigid, U-shaped hoop form the front sides of a parallelogram; in the area where its legs connect with the base, it is linked to the left and to the right side walls of the substructure, whereby, as far as is possible, the linkage points are located in the front area of the substructure. The parallelogram is completed by two rear moving arms, the effective lengths of which are shorter than those of the front sides, which are connected into one piece. The front moving arms engage approximately below the center of gravity of the roof, so that the function of the rear moving arms is basically only one of guidance.

In a preferred further development, the lift device also includes a telescoping tube with an energy accumulator, e.g. of compressed air or a helical spring. The expansion force is dimensioned so that the roof can be elevated and closed basically without exertion of force. This leaves only the mechanical losses, friction losses, etc. to be overcome in the operation.

Consequently, the lift device can be relatively simply constructed; it is also suitable for later installation in already existing transport carriers. It can also be integrated into the total aspect of the transport carrier in an optically pleasing manner. It can be made totally maintenance free. Opening and closing cause no noises that could frighten a horse.

Additional advantages and characteristics of the invention are described in the sub-claims and can be derived from the following description.

BRIEF DESCRIPTION OF THE DRAWINGS

An example of an execution of the invention is shown in the drawing, which will described in greater detail in the following with reference to the drawing but must not be understood as limiting the invention. The drawing shows:

FIG. 2 a side view of the carrier according to FIG. 1 for conveying horses, with elevated roof and showing the principles;

FIG. 3 a section through the linkage of a front moving arm to the roof.

DETAILED DESCRIPTION OF THE PREFERRED EMBODIMENTS

Figure 1:
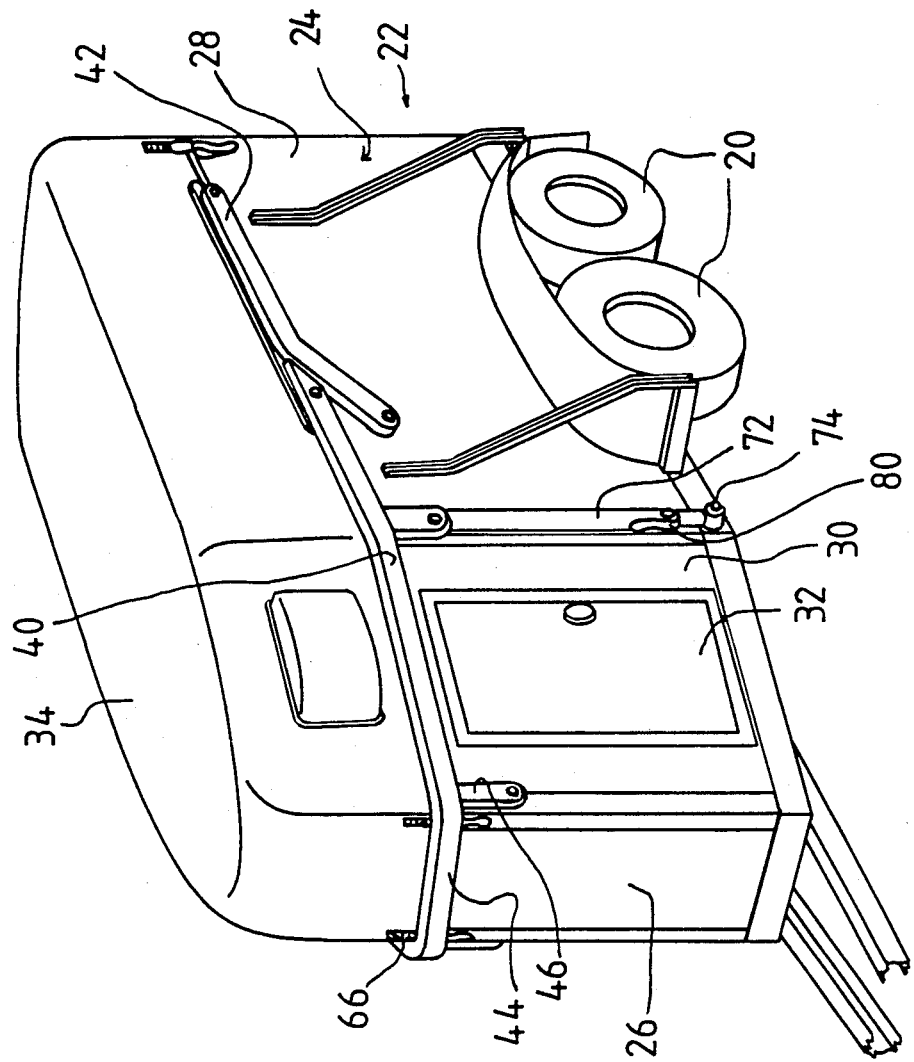
FIG. 1 a perspective view of a carrier for conveying horses, with a lift device; the roof is in the normal closed position.

The horse transport carrier shown in FIG. 1 in a perspective view has a tub-like substructure 22 mounted on a two-axle chassis 20, and consisting of a floor, a left side wall 24, a front wall, and a rear wall. In the latter a door—not shown in the figure—of a known type is provided, through which a horse can enter the interior of the horse transport trailer and also leave it. However, these parts do not represent a change from the known horse transport trailer, and thus, they need not be discussed in detail. The side wall 24 consists of a longer rear side wall part in the direction of travel, and a short, forward side wall part 30, which is oblique to the direction of travel, and in which a small door 32 is provided. With the exception of this door 32, the horse transport trailer is mirror immage symmetrical in the longitudinal direction.

A tub-shaped roof 34 is placed against the all-around closed upper edge of the substructure 22, which roof provides a rain-proof upwards closing of the substructure 22. The roof as well represents no changes in comparison to the known horse transport carrier, and consequently, the design of the roof need not be discussed in detail. Preferably, the roof consists of a shell of a synthetic material, particularly polyester, which is reinforced in a suitable manner. As a whole, the shell-shaped roof 34 has a high inherent rigidity due to its tub-like shape.

In the horse transport trailer shown in FIGS. 1 and 2, the forward front wall 26 is flat, it is vertical and placed at a 90° angle to the direction of travel. In other horse transport trailers, this front wall 26 is curved and tangentially joins the oblique forward part 30 of the side wall which, in turn, does not join the rear section 28 of the side wall at a bend, but in a curve. The course of the front end of such horse transport trailers is shown in FIG. 2 as a dashed line, whereby the reference figure for the front side is 36. In its frontal part, the roof is adjusted to the curved contour of the front wall 26; this is indicated in FIG. 2 by the front edge of the roof, which is shown as a dashed line.

Between the substructure 22 and the roof 34, a lift device is installed which will be described in greater detail in the following. On both sides of the substructure 22, the roof 34 is linked to the substructure 22 by means of a front moving arm 40 and a rear moving arm 42. The front moving arms 40 on both sides are rigid and—as in the illustrated execution example—preferably connected in one piece. Thereby, the front moving arms 40 form the legs of a U-shaped hoop, of which the base 44 runs parallel to the front wall 26. Starting from the base 44, each front moving arm 40, or each leg of the U-hoop, at first runs parallel to the related obliquely running side wall part 24, i.e. diverging and connecting, parallel with the rear side wall portion 28 in the area of the transition between the front side wall portion 30 and the rear side wall portion; in this area, the corresponding parts of the front moving arms on both sides run parallel to one another. The front moving arms 40 are not supported directly in a linkage 48 but rather via a short, downwards oriented arm 46 on the substructure 22. The location of this linkage 48 should be as far forward as possible; it can be seen from FIGS. 1 and 2 that the linkage point is located practically at the level of the plane front wall 26. Further, the linkage 48 is as far below the upper edge 50 of the substructure 22 as the arm 46 is long. The area where the front moving arms 40 connect with their respective vertical arms 46 is approximately equidistant from the base 44 of the U-hoop and from the linkage 48. Due to the arrangement of the linkage 48 at the lower end of the arm 46, the base 44 of the U-hoop retains a sufficient distance from the front wall 26 when the front moving arms 40 are swung upwards as shown in FIG. 2. This is particularly advantageous for the horse transport trailer with the curved front wall 26 as described above, i.e. the front edge 36 shown as a dashed line. As FIG. 2 shows, this execution as well provides a sufficient space between the front edge 36 of the trailer and the base 44 of the U-hoop. If the lift device had been designed merely for transport carriers with a plane front wall 26, the arm 46 could be left out and the linkage 48 arranged in the immediate vicinity of the front moving arm 40, e.g. in the above described connection area between this front moving arm 40 and the arm 46.

In the areas of their free ends, the front moving arms 40 are provided with chamfers 52, which will be discussed later, and in the vicinity of these chamfera 52, they are connected to a linkage 54 on the roof 34. The linkage 54 is located very close to the lower edge 56 of the roof 34 and approximately vertically below the center of gravity of the roof 34. The effective length of the two (equally long) front moving arms 40, i.e. the distance between the linkages 48 and 54, corresponds approximately to the height of the substructure 22.

The effective length of the two rear moving arms which are also of equal length, is only approximately 85-90 percent of the abovementioned effective length of the front arms 40, whereby the quadrilateral outline of the moving arms deviates slightly from a true parallelogram. Each one of the rear moving arms 42 (on both sides) is connected to the roof 34 in a linkage 58, and at the other end, they are supported in a linkage 60 on the substructure 22, namely in the rear portion 28 of the side wall. The described quadrilateral figure of moving arms is formed by the linkage points 48, 54, 58, and 60. The linkage 60 is located somewhat further forward of the midpoint of the total length of the substructure 22 and at the same elevation as the linkage 48. Between the linkages 54, 58 on the roof 34, the roof is reinforced on both sides by means of a stiffener 62 (see FIG. 3), which laterally extends slightly beyond the linkage points 54, 58. When the roof 34 is completely closed, a side perspective shows this stiffener as practically completely optically covered by the moving arms 40, 42.

In their lower third, the rear moving arms 42 have an approximately 30° angle 64. The effect is that in the elevated position shown in FIG. 2, their upper parts run practically parallel to the front moving arms 40, while their lower parts are almost vertical. By means of the angle 64, it is achieved that in the closed position of the roof 34 (See FIG. 1), their longer, upper portions run parallel to the edges 50, 56, and consequently to the plane separating the roof 34 and the substructure 22. The chamfer 52 will then be parallel to the lower portions of the rear moving arms 42, whereby only a minor space remains open. In the closed position, this creates the optical impression that the upper portions of the rear moving arms 42 are an elongation of the front moving arms 40. In the closed position, the U-hoop forming the front moving arms 40 rests above the separation plane between the roof 34 and the substructure 22 and covers the edges 50, 56, as shown in FIG. 1.

In the closed position, the roof 34 is fastened to the substructure 22 by means of a number of class 66, e.g. four of these. Other means of attachment are also possible, e.g. the rubber straps known from older vehicles.

A second arm 68 which, like the first arms, extends perpendicularly downwards over a distance of approximately 18 cm, is attached on the left side wall 24, shown in FIGS. 1 and 2, namely in the vicinity of the angle of the front moving arm 40 located there, but in the rear of the rear portion 28 of the side wall running in the direction of travel. At its lower, free end, it is connected in a linkage 70 with a telescoping rod 72 which is in turn supported in a linkage 74 at its lower end, at the level of the floor of the substructure 22 in its forwardmost, lowest corner area at the front left side wall portion 30. In the normal closed position, this telescoping rod 72 is vertical, and the linkages 48, 60, and 70 are at the same level.

The telescoping rod 72 consists of two concentric tubes, an external tube 76 and an internal tube 78, of which the latter is located inside the former and the two are under tension against one another by means of a contained helical pressure spring. In the lower end area of the external tube 76, a clamping lever 80 is provided, namely of the type known to be used for purposes of extending the rod length of window washing equipment. This makes it possible to arrest the external tube 76 on the internal tube 78 at any desired location between the normal closed position and the maximum opening position, namely by means of friction closure. It is also possible to utilize a different arresting device, e.g. with positive locking, instead of the clamping lever 80, but or this purpose, the internal tube 78 must be provided with notches at specific distances, into which a closing part of the arresting device can engage under spring pressure. Other designs are possible.

With respect to its force, the described, relatively long helical pressure spring accommodated in the telescope tube 72 is dimensioned so that it takes up the weight of the entire roof including the connected weights of the moving parts of the lift device. Preferably, it is even set at a force somewhat greater than the abovementioned value. When the clamping lever 80 is released, the roof will rise by itself into the elevated position shown in FIG. 2, and by means of a minor pulling effort of a few kg of the external tube 76, the roof 34 can be returned downwards into the normal closed position.

In this manner, any desired intermediate positions can be selected between the maximum opening position and the closed position. This has e.g. the advantage that the roof 34 can be slightly elevated when the horse transport trailer is not moving and when there is a horse in it. This provides fresh air to the horse.

The described telescoping rod 72 is merely an execution example of an advantageous (but in principle not necessary) weight equalization of the lift device. Instead of the described telescoping arrangement 72, one may use a gas pressure spring, an oil pressure shock absorber with energy accumulator, etc. In principle, the location of the telescoping rod 72 can also be freely selected, and it is also possible, for example, to install a main spring parallel to the front wall 26, between the base 44 of the U-hoop and a lower area of the front wall 26.

Finally, FIG. 3 demonstrates the design of a linkage 54; the linkages 58 are analogously designed. The interior space of the horse transport carrier is seen at the bottom of FIG. 3. A very flat interior stiffener strip 82 is provided, which is flush with the lower edge 56 of the roof 34 and basically serves to provide a secure location for fastening the roof 34. In the illustrated execution example, these fasteners are designed as countersunk screws. The previously described stiffener strip 62 is located on the outside so that the two stiffener strips 62, 82 combine to secure the roof 34.

The linkage 54 is structured as follows: A screw 84 penetrates a bore in the stiffener strip 62 and a nut 86 is screwed onto it on the inside of the roof 34. This screw provides tension for a sleeve 88, which pulls it against the stiffener strip 62. A bearing box 90 is installed in (welded into) the front moving arm 40; between this and the sleeve 88, there is a bearing plating in order to make the linkage points completely maintenance-free.

The U-hoop forming the two front moving arms 40 as well as the two rear moving arms 42 are made from stable rectangular tube of aluminum or steel, e.g. an aluminum tube 40×60×2.5.

At the lower edge 56 of the roof 34 or the upper edge 50 of the substructure 22, one may provide an elastic rubber seal in order to improve the tightness between the roof 34 and the substructure 22, e.g. a lip seal as known from the vehicle industry, or a foam rubber seal.

In the elevated position shown in FIG. 2, the front edge of the roof 34 is located in front of the front wall 26. At the front end, there is an open space more than one meter high between the upper edge 50 of the substructure 22 and the lower edge 56 of the roof 34; below the rear edge of the roof 34, the open space is approx. 80 cm.

I claim:
1. Carrier for conveying horses, comprising:
   a tub-like substructure (22) mounted on a chassis (20), a door for entry and exit of the horses being provided at a rear end of the substructure;
   a roof (34) supported by the substructure (22); and,
   a lift device located between the substructure (22) and the roof (34), the lift device being operable for lifting the roof (34) in relation to the substructure (22), whereby the roof (34) can be moved between a normal closed position on the substructure (22), to a raised position in which a free space is defined between the roof (34) and the substructure (22), the lift device having on each side of the carrier a front moving arm (40) and a rear moving arm (42), each said moving arm being connected on one hand with the substructure (22) by means of lower linkages (48, 60), and on the other hand with the roof (34) by means of upper linkages (54, 58), the front moving arms on each side of the carrier being rigidly interconnected, said front moving arms being legs of a U-shaped hoop of which a base (44) of the hoop is disposed substantially parallel to a front wall (26) of the carrier.

2. Carrier for conveying horses according to claim 1, wherein the lower linkages (48) of the front moving arms (40) on the substructure (22) are immediately adjacent a front edge (36) of the carrier at the front wall.

3. Carrier for conveying horses according to claim 1, wherein the upper linkages (54) of the front moving arms (40) on the roof (34) are located approximately below a center of mass of the roof (34).

4. Carrier for conveying horses according to claim 1, further comprising a power accumulator operable to urge the roof (34) upwardly from the substructure (22), compensating a shared weight borne by moving parts of the lift device.

5. Carrier for conveying horses according to claim 1, wherein in the normal closed position of the roof on the substructure (22), the moving arms (40, 42) are located at a same level as a lower edge (56) of the roof (34).

6. Carrier for conveying horses according to claim 1, wherein the lower linkages (48, 60) of the front and rear moving arms (40, 42) are located at a same level on the substructure (22).

7. Carrier for conveying horses according to claim 1, wherein the front moving arms (40) have an effective length greater than an effective length of the rear moving arms (42), whereby the roof is tilted when raised.

8. Carrier for conveying horses according to claim 6, wherein the front moving arms (40) have a chamfer (52) and the rear moving arms are disposed at an angle (64) corresponding to said chamfer (52) at least in one of the normal closed position of the roof (34) and the raised position of the roof (34).

9. Carrier for conveying horses according to claim 1, further comprising closing means (66) controllably operable to attach the roof (34) and the substructure (22) in the normal closed position.

10. Carrier for conveying horses according to claim 4, further comprising a clamping lever (80) engagable on the telescoping rod (72) at a plurality of desired positions between the normal closed position and the raised position.

11. Carrier for conveying horses according to claim 1, wherein the carrier is a trailer.

12. Carrier for conveying horses according to claim 4, wherein the power accumulator is a telescoping rod (72) urging apart the substructure (22) and the U-shaped hoop.

13. Carrier for conveying horses according to claim 12, wherein the telescoping rod (72) is attached by one end between the linkages (48, 54) of the front moving arm (40).

14. Carrier for conveying horses according to claim 1, wherein in the normal closed position of the roof on the substructure (22), the moving arms (40, 42) are located at a same level as an upper edge (50) of the substructure (22).

15. Carrier for conveying horses according to claim 7, wherein the effective length of the front moving arms is about 1.1 to 1.25 times greater than the effective length of the rear moving arms (42).

* * * * *